(12) United States Patent
Kouta (10) Patent No.: US 11,754,120 B2
(45) Date of Patent: Sep. 12, 2023

(54) LINEAR GUIDE MECHANISM AND LINEAR ACTUATOR

(71) Applicant: SMC CORPORATION, Tokyo (JP)

(72) Inventor: Naoki Kouta, Katsushika-ku (JP)

(73) Assignee: SMC CORPORATION, Tokyo (JP)

( * ) Notice: Subject to any disclaimer, the term of this patent is extended or adjusted under 35 U.S.C. 154(b) by 13 days.

(21) Appl. No.: 17/643,670

(22) Filed: Dec. 10, 2021

(65) Prior Publication Data

US 2022/0196066 A1 Jun. 23, 2022

(30) Foreign Application Priority Data

Dec. 21, 2020 (JP) .................................. 2020-211494

(51) Int. Cl.
*F16C 29/06* (2006.01)
*F16C 29/00* (2006.01)
*F16C 29/12* (2006.01)

(52) U.S. Cl.
CPC .......... *F16C 29/005* (2013.01); *F16C 29/001* (2013.01); *F16C 29/063* (2013.01); *F16C 29/12* (2013.01); *F16C 29/0602* (2013.01); *F16C 29/0638* (2013.01)

(58) Field of Classification Search
CPC .. F16C 29/001; F16C 29/005; F16C 29/0602; F16C 29/063; F16C 29/0638; F16C 29/0678; F16C 29/12
See application file for complete search history.

(56) References Cited

U.S. PATENT DOCUMENTS

| | | | | |
|---|---|---|---|---|
| 5,484,210 A | * | 1/1996 | Galione | F16C 29/126 384/57 |
| 6,344,718 B1 | | 2/2002 | Nagai et al. | |
| 7,806,041 B2 | * | 10/2010 | Someya | F16C 29/063 92/169.1 |
| 8,998,491 B2 | * | 4/2015 | Ishibashi | F15B 15/1471 384/49 |
| 2007/0237437 A1 | * | 10/2007 | Lee | F16C 29/00 384/45 |
| 2008/0253703 A1 | * | 10/2008 | Michioka | F16C 29/04 384/49 |
| 2010/0139426 A1 | * | 6/2010 | Mori | F16C 33/60 74/89.32 |

FOREIGN PATENT DOCUMENTS

| | | |
|---|---|---|
| JP | 4531053 B2 | 8/2010 |
| KR | 200383077 Y1 * | 4/2005 |

OTHER PUBLICATIONS

Extended European Search Report dated May 6, 2022 in European Patent Application No. 21213052.0, 8 pages.

* cited by examiner

*Primary Examiner* — Phillip A Johnson
(74) *Attorney, Agent, or Firm* — Oblon, McClelland, Maier & Neustadt, L.L.P.

(57) ABSTRACT

A linear guide mechanism includes an actuator side guide member, moving block side guide members disposed on both sides of the actuator side guide member, and a plurality of balls disposed in two rows, respectively, between the actuator side guide member and each of the moving block side guide members. Set screws are attached to a moving block.

8 Claims, 7 Drawing Sheets

LINEAR GUIDE MECHANISM AND LINEAR ACTUATOR

CROSS-REFERENCE TO RELATED APPLICATION

This application is based upon and claims the benefit of priority from Japanese Patent Application No. 2020-211494 filed on Dec. 21, 2020, the contents of which are incorporated herein by reference.

BACKGROUND OF THE INVENTION

Field of the Invention

The present invention relates to a linear guide mechanism that slidably supports, on an actuator, a moving block such as a slide table or the like having a workpiece mounting surface, and a linear actuator equipped with such a linear guide mechanism.

Description of the Related Art

Conventionally, a linear guide mechanism, which slidably supports, on an actuator, a slide table that is driven by the actuator, has been known. In such a linear guide mechanism, it has become an important theme to eliminate rattling or backlash of the slide table, and to further reduce sliding resistance. It is also known to support a slide table on an actuator using a plurality of rolling bodies such as balls.

For example, JP 4531053 B2 discloses a linear guide device in which a moving block is assembled to a track rail via a large number of rolling bodies. The track rail is equipped with a pair of rail members on which rolling surfaces for the rolling bodies are formed, and a rail housing provided with a pair of rail mounting grooves into which the rail members are fitted. A reference protrusion in contact with the rail member is formed in one of the rail mounting grooves. The rail member that is fitted into the other rail mounting groove is fixed with reference to such a reference protrusion. Consequently, parallelism between the pair of rail members is ensured.

SUMMARY OF THE INVENTION

Incidentally, concerning the guide members (rail members) on which the rolling surfaces for the rolling bodies are formed, such guide members are frequently required to have a high hardness especially on the rolling surfaces thereof, and there are cases in which a heat treatment (quenching/tempering) is carried out on the molded products serving as the guide members. In this case, due to the heat treatment, distortion occurs and straightness is lowered. Therefore, it becomes necessary to perform a grinding process after the heat treatment in order to improve straightness.

The present invention has the object of solving the aforementioned problems.

A linear guide mechanism according to the present invention is configured to slidably support a moving block on an actuator, and comprises an actuator side guide member attached to the actuator, a pair of moving block side guide members attached to the moving block, and disposed on both sides of the actuator side guide member, and a plurality of balls disposed in two rows, respectively, between the actuator side guide member and each of the moving block side guide members, wherein the actuator side guide member includes circulation holes through which the balls circulate. In addition, the moving block side guide members are made from a heat-treated steel, and a pressing mechanism configured to adjust a pre-loading of the balls and improve straightness of the moving block side guide members, is attached to the moving block. Set screws are used as the pressing mechanism.

According to the above-described linear guide mechanism, the straightness of the moving block side guide members, which are made from a heat-treated steel, can be improved by the set screws, and therefore, it is not necessary to implement a cutting process on the moving block side guide members. Further, the moving block is supported on the actuator by a structure (a supporting structure referred to as a circular arc) in which a plurality of balls that are arranged in two rows are disposed between the actuator side guide member and each of the moving block side guide members. Therefore, even if the pre-loading of the balls increases when the straightness is improved, an increase in sliding resistance of the moving block can be suppressed as much as possible.

In accordance with the linear guide mechanism according to the present invention, the straightness of the moving block side guide members, which has been decreased due to being heat-treated, can be improved by the set screws. In addition, even if the pre-loading of the balls increases when the straightness is improved, an increase in sliding resistance of the moving block can be suppressed as much as possible.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
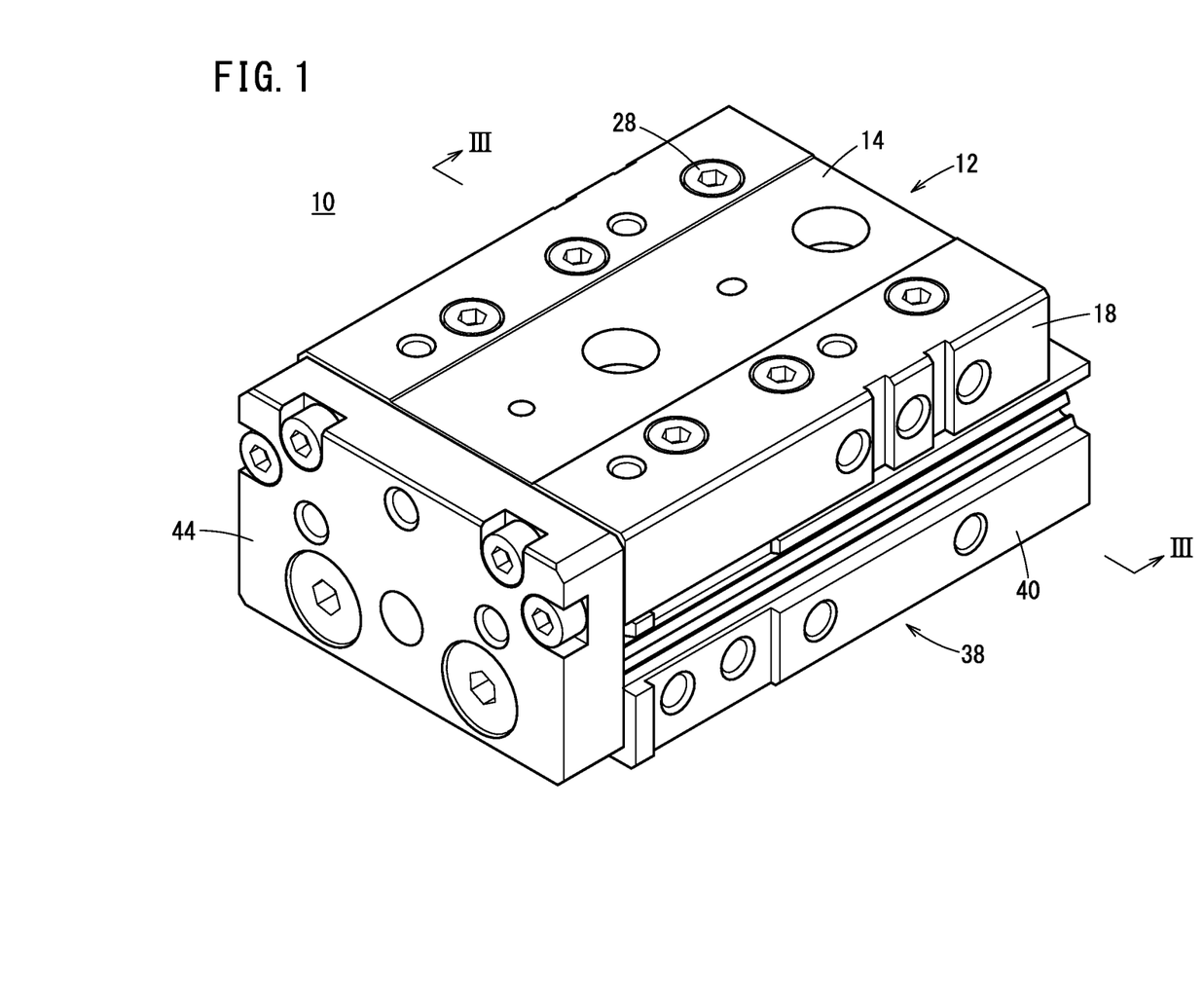
FIG. 1 is an external view of a linear actuator according to an embodiment of the present invention.
Figure 2:
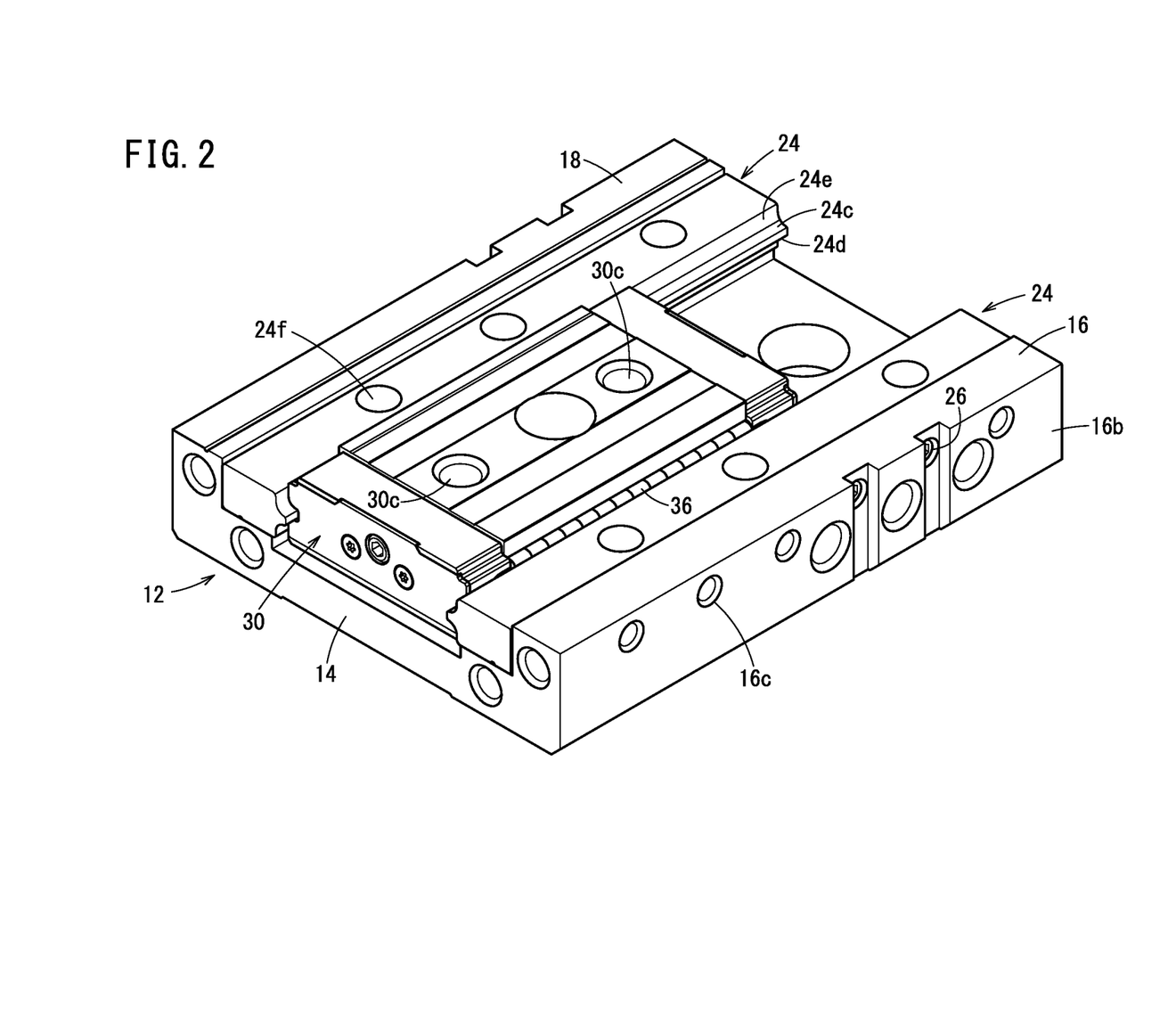
FIG. 2 is an external view of a linear guide mechanism that is mounted on the linear actuator shown in FIG. 1.

In the following description, when terms in relation to the up, down, left, and right directions are used, such terms refer to the directions shown in FIG. 3. As shown in FIGS. 1 and 2, a linear actuator 10 according to an embodiment of the present invention is equipped with an air cylinder 38 serving as an actuator, and a linear guide mechanism that slidably supports, on the air cylinder 38, a slide table 12 serving as a moving block. The linear guide mechanism includes the slide table 12, table side guide members 24 (moving block side guide members), an air cylinder side guide member 30 (actuator side guide member), and a plurality of balls 36 that are arranged between the table side guide members 24 and the air cylinder side guide member 30.

The slide table 12 is a member that is made from an aluminum alloy, and has a U-shaped cross section. The slide table 12 has a flat plate portion 14 having a rectangular shape when viewed in plan, and a pair of side wall portions (a first side wall portion 16 and a second side wall portion 18) that project downward from a pair of opposing sides of the flat plate portion 14. As will be discussed later, inner side surfaces 16a and 18a of the side wall portions 16 and 18 serve as reference surfaces for improving the straightness of the table side guide members 24, and are finished in the form of highly accurate flat surfaces (see FIG. 5). An upper surface of the slide table 12 is a flat surface on which a workpiece can be mounted.

Figure 5:
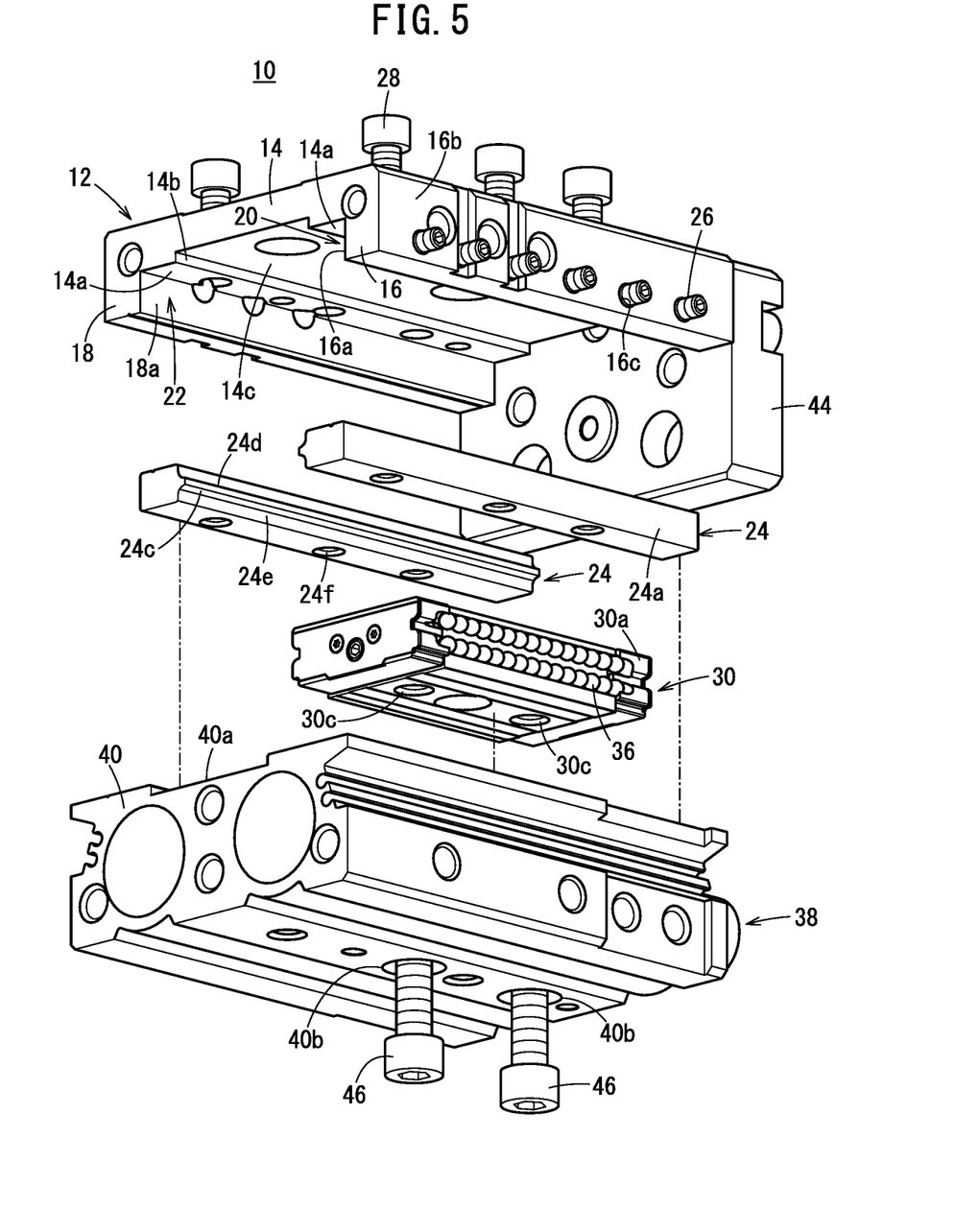
FIG. 5 is a view in which the linear actuator shown in FIG. 1 is expanded into parts or a group of parts and viewed from a different direction from that shown in FIG. 4.

As shown in FIG. 5, a lower surface of the flat plate portion 14 includes a pair of first bottom surfaces 14a in close proximity to the side wall portions 16 and 18, and a second bottom surface 14c connected via stepped surfaces 14b from the first bottom surfaces 14a. The distance from an upper surface of the flat plate portion 14 to the first bottom surfaces 14a is greater than the distance from the upper surface of the flat plate portion 14 to the second bottom surface 14c. The second bottom surface 14c forms a clearance into which upper portion of the air cylinder side guide member 30 enters. As will be discussed later, the first bottom surfaces 14a serve as reference surfaces for improving the straightness of the table side guide members 24, and are finished in the form of highly accurate flat surfaces.

The inner sides of the first side wall portion 16 and the second side wall portion 18 include a first mounting groove 20 and a second mounting groove 22 in which the table side guide members 24 are respectively mounted. The first mounting groove 20 is constituted by the first bottom surface 14a of the flat plate portion 14, and the inner side surface 16a of the side wall portion 16 that is perpendicular to the first bottom surface 14a. The second mounting groove 22 is constituted by the first bottom surface 14a of the flat plate portion 14, and the inner side surface 18a of the side wall portion 18 that is perpendicular to the first bottom surface 14a.

The first side wall portion 16 includes a plurality of screw holes 16c that penetrate therethrough in the left-right direction. The plurality of screw holes 16c are arranged alongside one another in the longitudinal direction of the first side wall portion 16. Set screws 26 are inserted and screwed into the screw holes 16c from an outer side surface 16b of the first side wall portion 16. Distal ends of the set screws 26 abut against an outer side surface 24a of one of the table side guide members 24. According to the present embodiment, a total of six of the set screws 26 are used. The second side wall portion 18 does not include screw holes therein.

Figure 3:
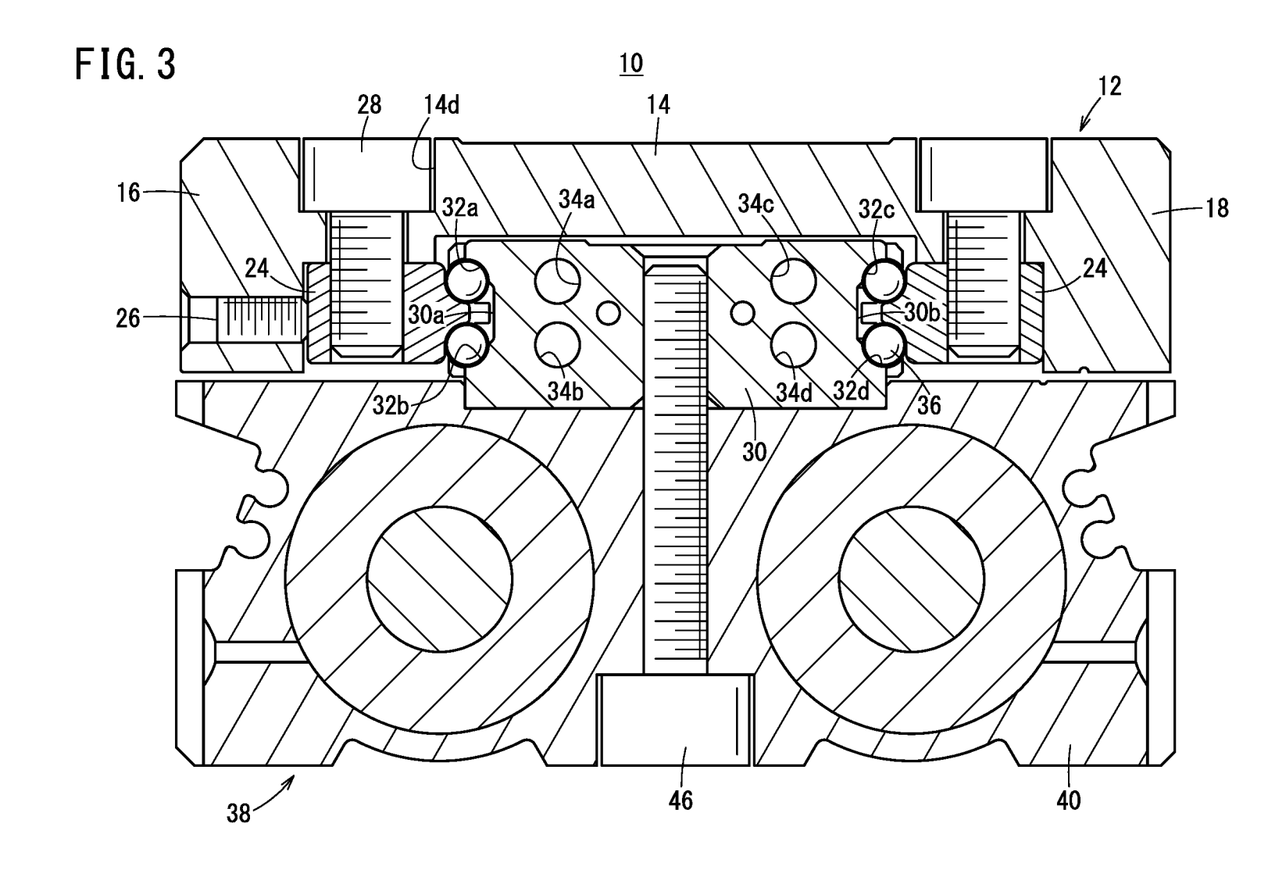
FIG. 3 is a cross-sectional view of the linear actuator taken along line shown in FIG. 1.
Figure 4:
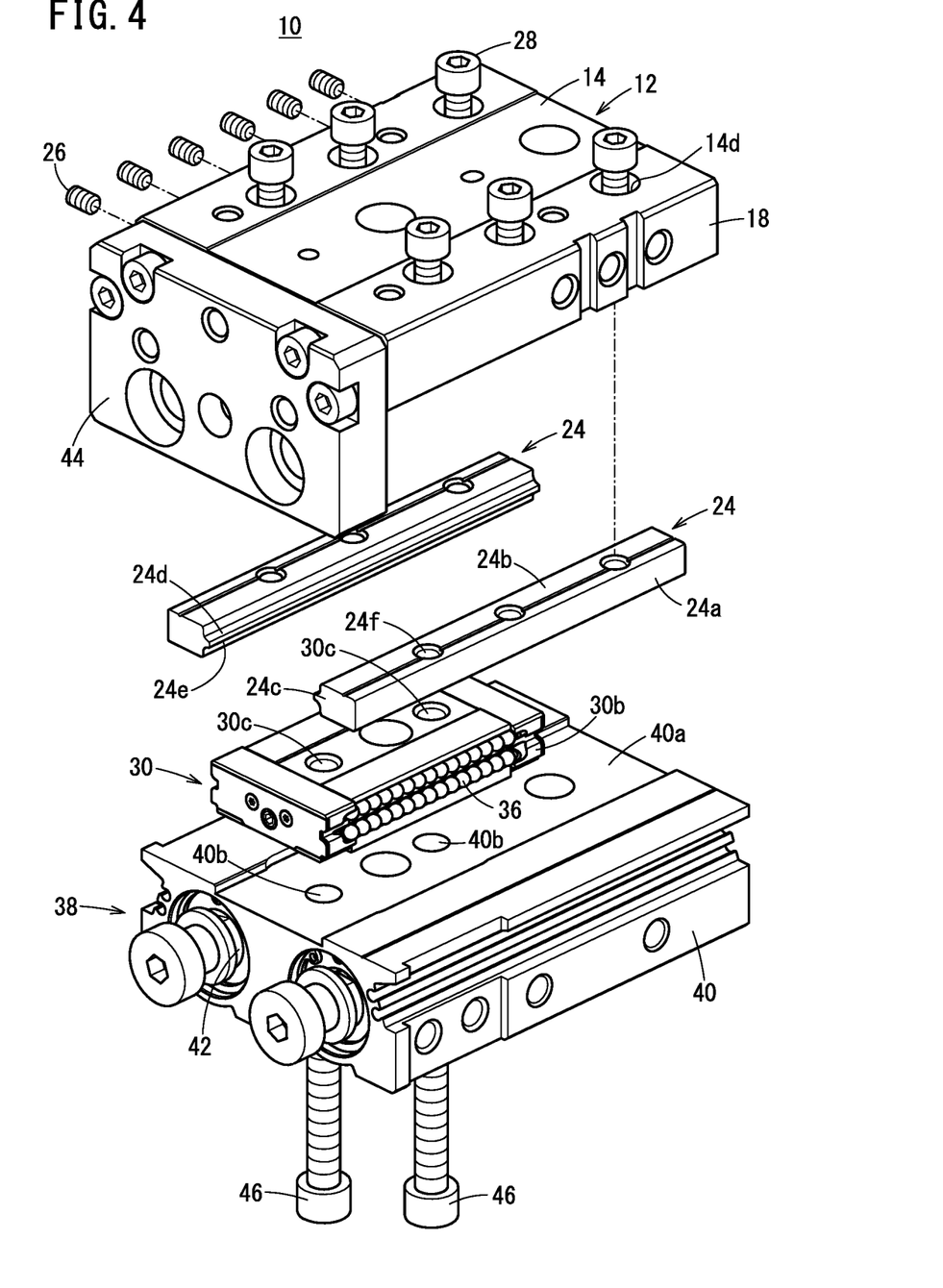
FIG. 4 is a view in which the linear actuator shown in FIG. 1 is expanded into parts or a group of parts and viewed from a predetermined direction.

The slide table 12 includes a plurality of fastening bolt insertion holes 14d (see FIG. 4). The fastening bolt insertion holes 14d penetrate through the flat plate portion 14 in the up-down direction. Lower ends of the fastening bolt insertion holes 14d open on the first bottom surfaces 14a. The plurality of fastening bolt insertion holes 14d are arranged alongside one another in the longitudinal direction of the first bottom surface 14a. Midway through the respective fastening bolt insertion holes 14d, stepped portions are formed against which head portions of fastening bolts 28 abut (see FIG. 3).

As shown in FIGS. 4 and 5, the table side guide members 24 are elongated members each having a rectangular cross section, and are attached to the first mounting groove 20 and the second mounting groove 22. The outer side surfaces 24a of the table side guide members 24 are aligned with the inner side surfaces 16a and 18a of the side wall portions 16 and 18 of the slide table 12. Upper surfaces 24b of the table side guide members 24 are aligned with the first bottom surfaces 14a of the slide table 12.

The inner side surfaces of the table side guide members 24 are equipped with convex portions 24c that extend over the entire length of the table side guide members 24 in the longitudinal direction. Upper sides and lower sides of the convex portions 24c are provided with first rolling surfaces 24d and second rolling surfaces 24e on which the balls 36 are capable of rolling, respectively.

The table side guide members 24 have a plurality of fastening bolt mounting holes 24f that penetrate therethrough in the up-down direction at positions corresponding to the fastening bolt insertion holes 14d of the slide table 12. The fastening bolts 28 are inserted into the fastening bolt insertion holes 14d from the upper surface of the slide table 12, and are screwed into the fastening bolt mounting holes 24f of the table side guide members 24. The fastening bolts 28 play the role of fixing the table side guide members 24 to the slide table 12. According to the present embodiment, each of the table side guide members 24 is fixed to the slide table 12 by three fastening bolts 28, which are arranged alongside one another in the longitudinal direction of the table side guide members 24.

Axes of the fastening bolts 28, which are screwed into the fastening bolt mounting holes 24f, and axes of the set screws 26, which are screwed into the screw holes 16c, are in a positional relationship of being perpendicular to each other when viewed from a direction along the sliding direction of the slide table 12 (see FIG. 3).

The table side guide members 24 are made from a heat-treated steel. Manufacturing of the table side guide members 24 includes a step of molding a rod-shaped or a plate-shaped material so as to have a predetermined cross-sectional shape by rolling, and a step of carrying out a heat-treatment on the molded products by quenching/tempering. Among rolling methods, cross-rolling is a suitable technique for manufacturing the table side guide members 24.

Cross-rolling is a rolling process performed by applying compressive forces in two directions perpendicular to each other by two sets of work rolls, and is useful for obtaining a molded product having a smooth surface. On the other hand, cross-rolling is unsuitable for obtaining a molded product having a large cross-sectional area. However, since the table side guide members 24 are members having a small cross-sectional area, they can be easily molded by cross-rolling.

The heat treatment by way of quenching/tempering applied to the molded products serving as the table side guide members 24 is carried out in order to impart a required hardness to the first rolling surfaces 24d and the second rolling surfaces 24e of the table side guide members 24. Due to such a heat treatment, the table side guide members 24 are formed with a martensitic structure. In the table side guide members 24, which are elongated and have a small cross-sectional area, warping occurs due to the heat treatment, and the straightness of the table side guide members 24 is lowered. A description will be given later concerning a method for improving such warping. Although it is not necessary in all cases to perform tempering after having performed quenching, it is preferable to perform tempering in order to restore toughness.

The air cylinder side guide member 30 is a member having a rectangular cross section, and the length thereof along the sliding direction of the slide table 12 is shorter than that of the table side guide members 24. One side surface 30a of the air cylinder side guide member 30 includes a first rolling surface 32a and a second rolling surface 32b which are arranged vertically. The balls 36 are capable of rolling on these rolling surfaces. Another side surface 30b of the air cylinder side guide member 30 includes a third rolling surface 32c and a fourth rolling surface 32d which are arranged vertically. The balls 36 are capable of rolling on these rolling surfaces (see FIG. 3). The air cylinder side guide member 30 has a pair of fixing bolt mounting holes 30c that penetrate therethrough in the up-down direction.

As shown in FIG. 3, the air cylinder side guide member 30 includes in the interior thereof first to fourth circulation holes 34a to 34d in which the balls 36 are capable of circulating. Both ends of the first to fourth rolling surfaces 32a to 32d of the air cylinder side guide member 30 are connected, respectively, to the first to fourth circulation holes 34a to 34d.

Accompanying sliding of the slide table 12, the plurality of balls 36 arranged between the first rolling surface 24d of one of the table side guide members 24 and the first rolling surface 32a of the air cylinder side guide member 30 that faces toward the first rolling surface 24d roll on these rolling surfaces, and circulate in the first circulation hole 34a. Accompanying sliding of the slide table 12, the plurality of balls 36 arranged between the second rolling surface 24e of the one of the table side guide members 24 and the second rolling surface 32b of the air cylinder side guide member 30 that faces toward the second rolling surface 24e roll on these rolling surfaces, and circulate in the second circulation hole 34b.

Similarly, the plurality of balls 36 arranged between the first rolling surface 24d of another of the table side guide members 24 and the third rolling surface 32c of the air cylinder side guide member 30 that faces toward the first rolling surface 24d roll on these rolling surfaces, and circulate in the third circulation hole 34c. The plurality of balls 36 arranged between the second rolling surface 24e of the other of the table side guide members 24 and the fourth rolling surface 32d of the air cylinder side guide member 30 that faces toward the second rolling surface 24e roll on these rolling surfaces, and circulate in the fourth circulation hole 34d.

As noted previously, the slide table 12 is supported on the air cylinder 38 by the structure (the supporting structure referred to as a circular arc) in which the plurality of balls 36 are arranged in two rows between the air cylinder side guide member 30 and each of the table side guide members 24.

The air cylinder side guide member 30 is made from a heat-treated steel in the same manner as the table side guide members 24. Since the air cylinder side guide member 30 having the first circulation hole 34a to the fourth circulation hole 34d has a large cross-sectional area, only a small amount of warping occurs thereon even if a heat-treatment is carried out on the molded product serving as the air cylinder side guide member 30.

The air cylinder 38 is equipped with a cylinder tube 40 having, in the interior thereof, a pair of cylinder chambers arranged in parallel, and pistons (neither of which is shown). End portions of piston rods 42 which are connected to the respective pistons extend outward from the cylinder tube 40, and are connected to an end plate 44. Further, the slide table 12 is connected to the end plate 44 (see FIG. 4).

As shown in FIG. 4, an upper surface of the cylinder tube 40 includes a recess 40a into which a lower portion of the air cylinder side guide member 30 is fitted. Further, the cylinder tube 40 has a pair of fixing bolt insertion holes 40b that penetrate therethrough in the up-down direction and open at the recess 40a. Fixing bolts 46 are inserted into the fixing bolt insertion holes 40b from below the cylinder tube 40. Distal ends of the fixing bolts 46 are screwed into the fixing bolt mounting holes 30c of the air cylinder side guide member 30 that is fitted into the recess 40a of the cylinder tube 40. Consequently, the air cylinder side guide member 30 is positioned and fixed to the cylinder tube 40.

When air is supplied to and discharged from the cylinder chamber and the pistons are driven, the slide table 12 slides in the same direction as the pistons. According to the present embodiment, the air cylinder 38 is used as the actuator for driving the slide table 12, however, an electric motor may also be used as the actuator.

Next, a description will be given concerning a method of improving the straightness of the table side guide members 24. As noted previously, in the table side guide members 24, which are elongated and have a small cross-sectional area, warping occurs when the heat treatment is carried out, and the straightness of the table side guide members 24 is lowered. Such warping can be divided into warping that curves in the left-right direction, and warping that curves in the up-down direction, occurring when the table side guide members 24 are attached to the slide table 12. Hereinafter, description will be given concerning a case in which warping in the left-right direction is corrected, and a case in which warping in the up-down direction is corrected.

(Case in which Warping in Left-Right Direction is Corrected)

Figure 6:
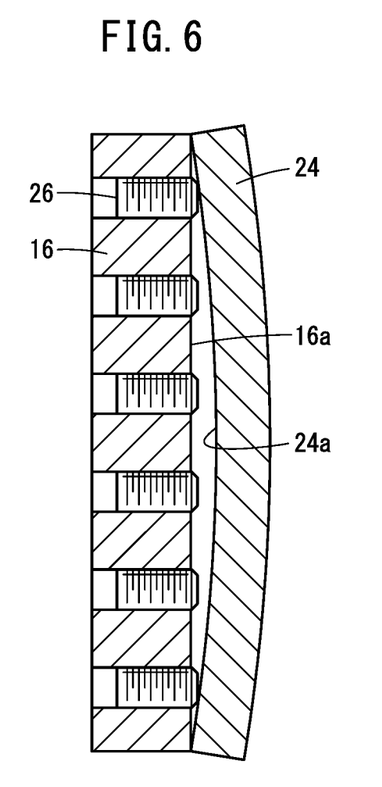
FIG. 6 is a diagram showing a state in which a table side guide member of the linear actuator shown in FIG. 1 is curved in a left-right direction.

In FIG. 6, an aspect is shown in which the table side guide member 24 is curved so as to be convex toward the inner side in the interior of the first mounting groove 20 of the slide table 12, and more specifically, an aspect is shown in which the table side guide member 24 is curved in a manner so that a central portion thereof in the longitudinal direction is further away from the inner side surface 16a of the first side wall portion 16 than both end portions thereof in the longitudinal direction are. In FIG. 6, the warping of the table side guide member 24 is shown in an exaggerated manner for the sake of convenience. In order to correct such warping, the amount by which the distal ends of the respective set screws 26, which are mounted in the screw holes 16c of the first side wall portion 16 of the slide table 12, protrude toward the table side guide member 24 may be adjusted.

More specifically, in a state in which the cylinder tube 40 of the air cylinder 38 is fixed to a floor surface or the like, a distal end of a tool is inserted into the screw holes 16c of the first side wall portion 16 of the slide table 12 from the outer side of the first side wall portion 16 to rotate the set screws 26, whereby the amount by which the set screws 26 positioned close to both end portions of the table side guide member 24 in the longitudinal direction protrude is increased. At this time, along therewith, the amount by which the set screws 26 positioned close to the central portion of the table side guide member 24 in the longitudinal direction protrude may be adjusted so as to correspond to the aforementioned protruding amount.

When the outer side surface 24a of the table side guide member 24 is pressed by the plurality of set screws 26, the inner side surface receives a reaction force from the plurality of balls 36 at contact points with the balls 36. Accordingly, if the amount by which the set screws 26 protrude is adjusted in the manner described above, the straightness of the table side guide member 24 can be improved. More specifically, the straightness of the table side guide member 24 in the first mounting groove 20 can be improved with reference to the inner side surface 16a of the first side wall portion 16 of the slide table 12.

In the case that the table side guide member 24 is curved so as to be convex toward the outer side in the interior of the first mounting groove 20 of the slide table 12, and more specifically, in the case that the table side guide member 24 is curved in a manner so that both end portions thereof in the longitudinal direction are further away from the inner side surface 16a of the first side wall portion 16 than the central portion thereof in the longitudinal direction is, the amount by which the set screws 26 positioned close to the central portion of the table side guide member 24 in the longitudinal direction protrude is increased. At this time, along therewith, the amount by which the set screws 26 positioned close to both ends of the table side guide member 24 in the longitudinal direction protrude may be adjusted so as to correspond to the aforementioned protruding amount.

Further, in the case that the table side guide member 24 is curved so as to be convex toward the inner side or the outer side in the second mounting groove 22 of the slide table 12, the amount by which the respective set screws 26 protrude may be increased. If the amount by which the set screws 26 protrude is increased overall, the force with which the second side wall portion 18, which attempts to maintain the distance from the first side wall portion 16 due to the rigidity of the slide table 12, presses on the table side guide member 24 in the second mounting groove 22 becomes large. Accordingly, the straightness of the table side guide member 24 in the second mounting groove 22 is improved with reference to the inner side surface 18a of the second side wall portion 18.

(Case in which Warping in Up-Down Direction is Corrected)

Figure 7:
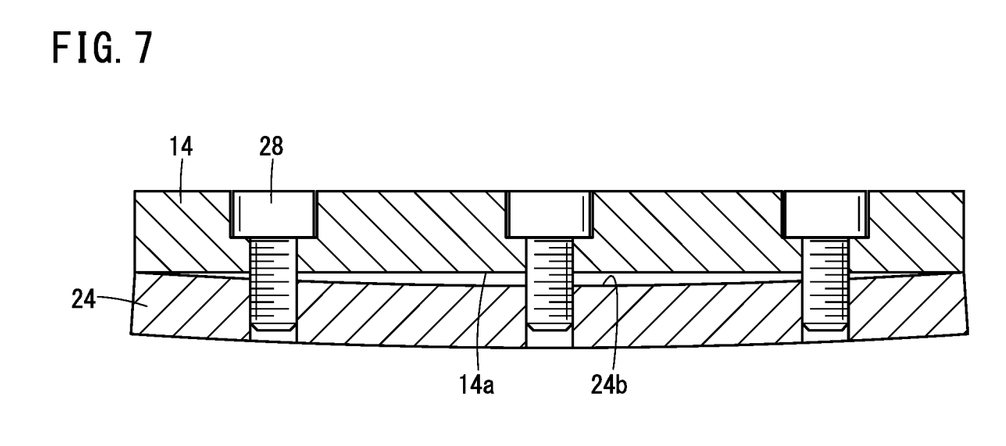
FIG. 7 is a diagram showing a state in which the table side guide member of the linear actuator shown in FIG. 1 is curved in an up-down direction.

In FIG. 7, an aspect is shown in which the table side guide member 24 is curved so as to be convex toward the lower side in the interior of the first mounting groove 20 or in the interior of the second mounting groove 22 of the slide table 12, and more specifically, an aspect is shown in which the table side guide member 24 is curved in a manner so that a central portion thereof in the longitudinal direction is further away from the first bottom surface 14a of the slide table 12 than both end portions thereof in the longitudinal direction are. In FIG. 7, the warping of the table side guide member 24 is shown in an exaggerated manner for the sake of convenience. In order to correct such warping, the amount by which the fastening bolts 28, which fix the table side guide member 24 to the slide table 12, are tightened may be increased.

More specifically, when a tool is engaged with the heads of the respective fastening bolts 28 that face toward the upper surface of the slide table 12 to rotate the fastening bolts 28 in a predetermined direction, the distance between the back surfaces of the heads of the fastening bolts 28 that abut against the stepped portions of the fastening bolt insertion holes 14d of the flat plate portion 14, and the upper surface 24b of the table side guide member 24, is reduced. Consequently, the upper surface 24b of the table side guide member 24 is pressed against the first bottom surface 14a of the slide table 12, and the straightness of the table side guide member 24 is improved. More specifically, the straightness of the table side guide member 24 is improved with reference to the first bottom surface 14a of the slide table 12.

Similarly, in the case that the table side guide member 24 is curved so as to be convex toward the upper side in the interior of the first mounting groove 20 or in the interior of the second mounting groove 22 of the slide table 12, and more specifically, in the case that the table side guide member 24 is curved in a manner so that both end portions thereof in the longitudinal direction are further away from the first bottom surface 14a of the slide table 12 than the central portion thereof in the longitudinal direction is, the amount by which the respective fastening bolts 28 are tightened may be increased.

The method of correcting warping in the left-right direction and the method of correcting warping in the up-down direction of the table side guide members 24 are as described above. In the case of the warping having components in both the left-right direction and the up-down direction, the warping may be corrected by combining both adjustment by the set screws 26 and tightening by the fastening bolts 28. Since the table side guide members 24 is elongated and the cross-sectional area thereof is small, the correction of warping is made easier. In the case that warping is corrected at a time that the table side guide members 24 are incorporated into the first mounting groove 20 or the second mounting groove 22 of the slide table 12, the state of warping (the warping direction or the like) of the table side guide members 24 after having been subjected to the heat treatment is preferably determined beforehand in advance.

Incidentally, the set screws 26 also play the role of adjusting the pre-loading of the balls 36. This is because, if the amount by which the respective set screws 26 protrude is increased, the pre-loading of the balls 36 can be increased, whereas if the amount by which the respective set screws 26 protrude is reduced, the pre-loading of the balls 36 can be decreased. There is an appropriate range for the magnitude of the pre-loading of the balls 36, and if the pre-loading falls below the appropriate range, rattling or backlash occurs, whereas if the pre-loading exceeds the appropriate range, sliding resistance of the slide table 12 becomes excessive.

In this instance, a support structure referred to as a circular arc, in which two rows of balls are disposed on each of the left and right sides, is significantly more satisfactory in terms of a rolling resistance characteristic of the balls with respect to pre-loading of the balls, in comparison with a support structure referred to as a Gothic arch, in which a single row of balls is disposed on each of the left and right sides. More specifically, in such a circular arc, the rolling resistance does not increase so much, even if the pre-loading of the balls increases.

The pre-loading of the balls 36 increases accompanied by the warping of the table side guide members 24 in the left-right direction being corrected by the set screws 26. However, the slide table 12 is supported on the air cylinder 38 by the circular arc, and therefore, even if the pre-loading of the balls 36 increases, an increase in the sliding resistance of the slide table 12 can be suppressed as much as possible.

In accordance with the linear guide mechanism according to the present embodiment, the straightness of the table side guide members 24 can be improved by the set screws 26 and the fastening bolts 28. Therefore, there is no need to carry out a grinding process on the table side guide members 24 after having been subjected to the heat treatment, and it is possible to eliminate rattling or backlash when the slide table 12 slides.

Further, since the table side guide members 24 are not provided with circulation holes therein for the balls 36, and are elongated members with a small cross-sectional area, it is possible to easily improve the straightness of the table side guide members 24 by the set screws 26 and the fastening bolts 28.

The present invention is not limited to the embodiment described above, and various configurations may be adopted therein without departing from the essence and gist of the present invention.

What is claimed is:

1. A linear guide mechanism configured to slidably support a moving block on an actuator, the linear guide mechanism comprising:
   an actuator side guide member attached to the actuator;
   a pair of moving block side guide members attached to the moving block, and disposed on both sides of the actuator side guide member; and
   a plurality of balls disposed in two rows, respectively, between the actuator side guide member and each of the moving block side guide members,
   wherein the actuator side guide member includes circulation holes through which the balls circulate,
   the moving block side guide members are made from a heat-treated steel, and
   a pressing mechanism configured to adjust a pre-loading of the balls is attached to the moving block, wherein
   a set screw serves as the pressing mechanism, and
   the set screw is screwed into a screw hole penetrating through a side wall portion of the moving block, and a distal end of the set screw abuts against an outer side surface of the moving block side guide members.

2. The linear guide mechanism according to claim 1, wherein the set screw is provided in plurality, and the set screws are arranged alongside one another in a longitudinal direction of the side wall portion of the moving block.

3. The linear guide mechanism according to claim 1, further comprising a fastening bolt configured to fix each of the moving block side guide members to the moving block, wherein
   an axis of the fastening bolt and an axis of the set screw are in a positional relationship of being perpendicular to each other when viewed from a direction along a sliding direction of the moving block.

4. The linear guide mechanism according to claim 3, wherein the fastening bolt is provided in plurality, and the fastening bolts are arranged alongside one another in a longitudinal direction of the moving block side guide members.

5. The linear guide mechanism according to claim 1, wherein the moving block side guide members are forged products formed by rolling.

6. The linear guide mechanism according to claim 1, wherein the moving block side guide members are longer in a sliding direction of the moving block than the actuator side guide member.

7. A linear actuator equipped with a linear guide mechanism configured to slidably support a moving block on an actuator, the linear guide mechanism comprising:
   an actuator side guide member attached to the actuator;
   a pair of moving block side guide members attached to the moving block, and disposed on both sides of the actuator side guide member; and
   a plurality of balls disposed in two rows, respectively, between the actuator side guide member and each of the moving block side guide members,
   wherein the actuator side guide member includes circulation holes through which the balls circulate,
   the moving block side guide members are made from a heat-treated steel,
   a pressing mechanism configured to adjust a pre-loading of the balls is attached to the moving block,
   wherein an air cylinder is used as the actuator,
   a set screw serves as the pressing mechanism, and
   the set screw is screwed into a screw hole penetrating through a side wall portion of the moving block, and a distal end of the set screw abuts against an outer side surface of the moving block side guide members.

8. A linear actuator equipped with a linear guide mechanism configured to slidably support a moving block on an actuator, the linear guide mechanism comprising:
   an actuator side guide member attached to the actuator;
   a pair of moving block side guide members attached to the moving block, and disposed on both sides of the actuator side guide member; and
   a plurality of balls disposed in two rows, respectively, between the actuator side guide member and each of the moving block side guide members,
   wherein the actuator side guide member includes circulation holes through which the balls circulate,
   the moving block side guide members are made from a heat-treated steel,
   a pressing mechanism configured to adjust a pre-loading of the balls is attached to the moving block,
   wherein
   an electric motor is used as the actuator,
   a set screw serves as the pressing mechanism, and
   the set screw is screwed into a screw hole penetrating through a side wall portion of the moving block, and a distal end of the set screw abuts against an outer side surface of the moving block side guide members.

* * * * *